(12) United States Patent
Liu et al.

(10) Patent No.: US 12,076,673 B2
(45) Date of Patent: Sep. 3, 2024

(54) FILTER ELEMENT MOUNTING STRUCTURE

(71) Applicant: Nanjing Hanshu Environmental Protection Equipment Co., Ltd., Nanjing (CN)

(72) Inventors: Guo Liu, Nanjing (CN); Xiaohan Liu, Nanjing (CN)

(73) Assignee: Nanjing Hanshu Environmental Protection Equipment Co., Ltd., Nanjing (CN)

( * ) Notice: Subject to any disclaimer, the term of this patent is extended or adjusted under 35 U.S.C. 154(b) by 0 days.

(21) Appl. No.: 18/631,965

(22) Filed: Apr. 10, 2024

(65) Prior Publication Data

US 2024/0252960 A1 Aug. 1, 2024

Related U.S. Application Data

(63) Continuation of application No. PCT/CN2022/126892, filed on Oct. 24, 2022.

(30) Foreign Application Priority Data

Nov. 29, 2021 (CN) .......................... 202111431686.6

(51) Int. Cl.
B01D 35/30 (2006.01)

(52) U.S. Cl.
CPC .......... *B01D 35/306* (2013.01); *B01D 35/30* (2013.01); *B01D 2201/31* (2013.01)

(58) Field of Classification Search
CPC ... B01D 35/30; B01D 35/306; B01D 2201/31
See application file for complete search history.

(56) References Cited

U.S. PATENT DOCUMENTS

| 2011/0247974 A1 | 10/2011 | Gale et al. |
| 2021/0146281 A1 | 5/2021 | McCollough et al. |

FOREIGN PATENT DOCUMENTS

| CN | 106807142 A | 6/2017 |
| CN | 209076219 U | 7/2019 |
| CN | 111558252 A | 8/2020 |
| CN | 211255287 U | 8/2020 |
| CN | 112357980 A | 2/2021 |
| CN | 113908618 A | 1/2022 |

OTHER PUBLICATIONS

Internation Search Report of PCT/CN2022/126892, Mailed Jan. 11, 2023.

*Primary Examiner* — John Kim (57) ABSTRACT

A filter element mounting structure comprises a switch member arranged on a shell, a limiting member and a driving mechanism; the driving mechanism is arranged on the shell, the limiting member is connected with the driving mechanism, a locking groove is formed on a filter element, the limiting member comprises a plurality of locking positions comprising a first locking position, a second locking position and a third locking position; when the limiting member is in the first locking position, the filter element is mounted in the shell, when the filter element is mounted in the shell, the switch member is touched, and the driving mechanism controls the limiting member to move to the second locking position and lock the filter element; and when the driving mechanism drives the limiting member to move to the third locking position, the limiting member provides an ejecting force to eject the filter element.

15 Claims, 8 Drawing Sheets

FILTER ELEMENT MOUNTING STRUCTURE

CROSS-REFERENCE TO RELATED APPLICATIONS

This application is a continuation of International Patent Application No. PCT/CN2022/126892 with a filing date of Oct. 24, 2022, designating the United States, now pending, and further claims priority to Chinese Patent Application No. 202111431686.6 with a filing date of Nov. 29, 2021. The content of the aforementioned applications, including any intervening amendments thereto, are incorporated herein by reference.

TECHNICAL FIELD

The present invention relates to the technical field of filter element mounting, and more particularly to a filter element mounting structure.

BACKGROUND OF THE PRESENT INVENTION

A filter element in the prior art usually comprises a cylindrical shell and a filter membrane core arranged in the shell; and multiple concentric separation rings are formed at a head portion of the shell, a raw water inlet, a concentrated water outlet, a purified water outlet and other water ports are defined between the separation rings, and a screwing portion is integrally formed at a tail portion of the shell. A sealing ring is sleeved on the separation rings, and a sliding clamp is formed at the head portion of the shell.

The filter element needs to be mounted on a host machine of a water purifier, and specifically, a cylindrical mounting cavity extending inwardly is formed at a side portion of the host machine, a base is formed at a bottom portion of the mounting cavity, and the base is provided with an interface matched with the separation rings, a sliding groove matched with the sliding clamp at the head portion of the shell and a slide stopping portion at a tail end. A specific mounting process is that: the filter element extends into a cavity bottom of the mounting cavity, so that the separation rings are inserted into the interface of the base, and meanwhile, the screwing portion at the tail portion of the shell is screwed to rotate the shell, so that the shell is clamped with the base, and finally, the sliding clamp is rotationally introduced into the slide stopping portion for locking. At this time, the sealing ring plays a sealing role at a joint.

However, during the mounting or disassembly of the filter element, due to the interference fit between the sealing ring and the interface of the base, and the interference fit between the sliding clamp at the head portion of the shell and the slide stopping portion at the tail end of the sliding groove of the base, when the filter element is mounted, one hand needs to apply a screwing force while applying an inserting force, and the other hand needs to hold the host machine to avoid the host machine from moving under an excessively large inserting force; and when the filter element is disassembled, an initial stage of disassembly is particularly laborious because of structural characteristics of the slide stopping portion, which makes an operation process of the mounting or disassembly of the filter element very difficult, so that non-professionals cannot complete the mounting or disassembly sometimes.

SUMMARY OF THE PRESENT INVENTION

Aiming at the defects in the prior art, the present invention is intended to provide a filter element mounting structure, which has the advantages that axial and circumferential displacements are not easy to occur after a filter element is mounted, and the effect of automatic control of disassembly and assembly is realized.

In order to achieve the object above, the present invention provides the following technical solution.

A filter element mounting structure comprises a driving mechanism arranged on a shell, wherein the driving mechanism is connected with a limiting member;

a switch member, wherein the switch member is arranged on the shell; and a filter element, wherein a cavity for mounting the filter element is also formed in the shell, and a locking groove is formed on the filter element;

wherein, when the driving mechanism drives the limiting member to move, a movement position of the limiting member is divided into a plurality of locking positions, and the plurality of locking positions comprise a first locking position, a second locking position and a third locking position;

the driving mechanism drives the limiting member to be in the first locking position, when the filter element is mounted in the shell, the limiting member is inserted into the locking groove, and the filter element touches the switch member, when the switch member is touched, the driving mechanism is controlled to start up, so that the driving mechanism drives the limiting member to move to the second locking position, and when the limiting member is in the second locking position, the filter element is locked; and when the driving mechanism drives the limiting member to move to the third locking position, the limiting member provides an ejecting force to eject the filter element, and the filter element is ejected from the shell under an action of the ejecting force.

As a further improvement of the present invention, a width of an opening of the locking groove is larger than a width of the limiting member, so that when the limiting member is in the first locking position, the limiting member is inserted into the locking groove through the opening of the locking groove.

As a further improvement of the present invention, a fastening surface is formed in the locking groove, and when the limiting member is in the second locking position, the limiting member provides a limiting surface which abuts against and is locked with the fastening surface, and when the limiting surface abuts against the fastening surface, the filter element is locked in an axial direction.

As a further improvement of the present invention, when the limiting member is in the second locking position, the limiting member provides an abutting surface which is attached to a side wall of the locking groove, and when the abutting surface abuts against the filter element, the filter element is locked in a circumferential direction.

As a further improvement of the present invention, the driving mechanism provides a rotating force to drive the limiting member to rotate.

As a further improvement of the present invention, the filter element mounting structure further comprises an intelligent control detection unit, wherein the intelligent control detection unit comprises a reset detection element and a locking detection element, a locking detection position for locking the filter element is arranged in the cavity, the locking detection element is arranged in the locking detection position, the locking detection element is used for detecting whether the limiting member is in the locking position, and the reset detection element is used for detecting whether the filter element is pulled out.

As a further improvement of the present invention, the reset detection element sends a reset signal to the driving mechanism when detecting that the filter element is pulled out, and the driving mechanism drives the limiting member to move to the first locking position.

As a further improvement of the present invention, when the filter element touches the switch member, the switch member forms an electrical signal, the driving mechanism drives the limiting member to move when receiving the electrical signal, and when the locking detection element detects that the limiting member is in the locking position, the driving mechanism is controlled to stop driving the limiting member to move.

As a further improvement of the present invention, the shell is further provided with a connecting seat in an inner side direction of the cavity, a connecting member is arranged in the connecting seat, an end portion of the filter element comprises a connector tube, the connecting member comprises a connecting hole for inserting the connector tube, a connecting mechanism for driving the connecting member to be connected with the connector tube is also arranged on the connecting seat, and the switch member also controls the connecting mechanism to start up, so as to drive the connecting member to move towards the filter element and be connected with the connector tube.

As a further improvement of the present invention, the connecting mechanism comprises a control member and a transmission member, the transmission member is connected with the connecting member, the control member drives the connecting member to move in an axial direction of the filter element through the transmission member, and the transmission member provides a rotating force to drive the connecting member to move.

As a further improvement of the present invention, the connecting member provides a transmission surface connected with the transmission member, and the transmission member drives the connecting member to move in the axial direction of the filter element through the transmission surface.

As a further improvement of the present invention, the connecting member is further provided with a guide surface in contact with the connecting seat, and the guide surface is used for moving the connecting member in the axial direction of the filter element.

As a further improvement of the present invention, a plurality of position limit sensors for detecting a position of the connecting member are arranged on the connecting seat, a position limit receiver is arranged on the connecting member, and when the connecting member is connected with the filter element, the position limit sensors send an electrical signal of connection to the control member, and the control member stops controlling the transmission member to drive the connecting member to move.

As a further improvement of the present invention, a resistance reduction member is also arranged on the connecting seat, the resistance reduction member is connected with the transmission member, and the resistance reduction member is used for reducing resistance of the transmission member during rotating.

As a further improvement of the present invention, an end cover is also arranged on one side of the connecting seat far away from the shell.

As a further improvement of the present invention, a controller for actively controlling the driving mechanism and the connecting mechanism is also arranged on the shell, when the controller is triggered, the control member is controlled to drive the connecting member to move away from the filter element, and when the controller is triggered, the driving mechanism is also controlled to drive the limiting member to move to the third locking position.

The present invention has the beneficial effects that: when the filter element is inserted into the shell, the driving mechanism drives the limiting member to be in the first locking position, so that the limiting member can be inserted into the locking groove when the filter element is inserted, when the filter element is mounted in the shell, the filter element touches the switch member arranged on the shell, when the switch member is triggered, the driving mechanism is controlled to drive the limiting member to move to the second locking position, and when the limiting member is in the second locking position, the filter element is locked, so that the filter element will not displace in the axial direction or rotate in the circumferential direction under a hydraulic pressure fluctuation, thus achieving the purpose of mounting and locking the filter element, and when the driving mechanism drives the limiting member to rotate to the third locking position, the limiting member provides the ejecting force to eject the filter element, thus realizing automatic control of disassembly and assembly of the filter element.

Reference numerals: 1 refers to shell; 2 refers to switch member; 3 refers to limiting member; 31 refers to first locking position; 32 refers to second locking position; 33 refers to the third locking position; 34 refers to limiting surface; 35 refers to abutting surface; 4 refers to driving mechanism; 5 refers to filter element; 51 refers to locking groove; 52 refers to fastening surface; 53 refers to connector tube; 6 refers to connecting seat; 61 refers to resistance reduction member; 62 refers to end cover; 7 refers to connecting member; 71 refers to connecting hole; 72 refers to transmission surface; 73 refers to guide surface; 8 refers to connecting mechanism; 81 refers to control member; and 82 refers to transmission member.

DETAILED DESCRIPTION OF PREFERRED EMBODIMENTS

The present invention is further described in detail hereinafter with reference to the drawings and embodiments. The same parts are denoted by the same reference numerals. It should be noted that the terms "front", "back", "left", "right", "up", and "down" used in the following description refer to the directions in the drawings, and the terms "bottom surface" and "top surface", and "inner" and "outer" refer to the directions toward or far away from geometric centers of specific parts respectively.

Embodiment 1

With reference to FIG. 1 to FIG. 6, a specific implementation of a filter element mounting structure according to the present invention comprises a switch member 2 arranged on a shell 1, wherein the switch member 2 is a contact-piece-type micro-control switch in this embodiment, and further comprises a limiting member 3 and a driving mechanism 4. A side wall of the shell 1 is provided with a mounting frame, the driving mechanism 4 is arranged on the mounting frame, and the limiting member 3 is connected with the driving mechanism 4, so that the driving mechanism 4 can drive the limiting member 3, and the driving mechanism 4 provides a rotating force to drive the limiting member 3 to rotate. A cavity for mounting a filter element 5 is formed in the shell 1, a locking groove 51 is formed on the filter element 5, and the locking groove 51 is formed on a side wall of an end portion of the filter element 5. The limiting member 3 comprises a plurality of locking positions, the plurality of locking positions comprise a first locking position 31, a second locking position 32 and a third locking position 33, and a width of an opening of the locking groove 51 is larger than a width of the limiting member 3, so that when the limiting member 3 is in the first locking position 31, the limiting member 3 is inserted into the locking groove 51 through the opening of the locking groove 51.

The filter element mounting structure further comprises an intelligent control detection unit, wherein the intelligent control detection unit comprises a locking detection element, a locking detection position is arranged in the cavity, the locking detection element is arranged in the locking detection position, and the locking detection element is used for detecting whether the limiting member 3 is in the locking position.

Figure 1:
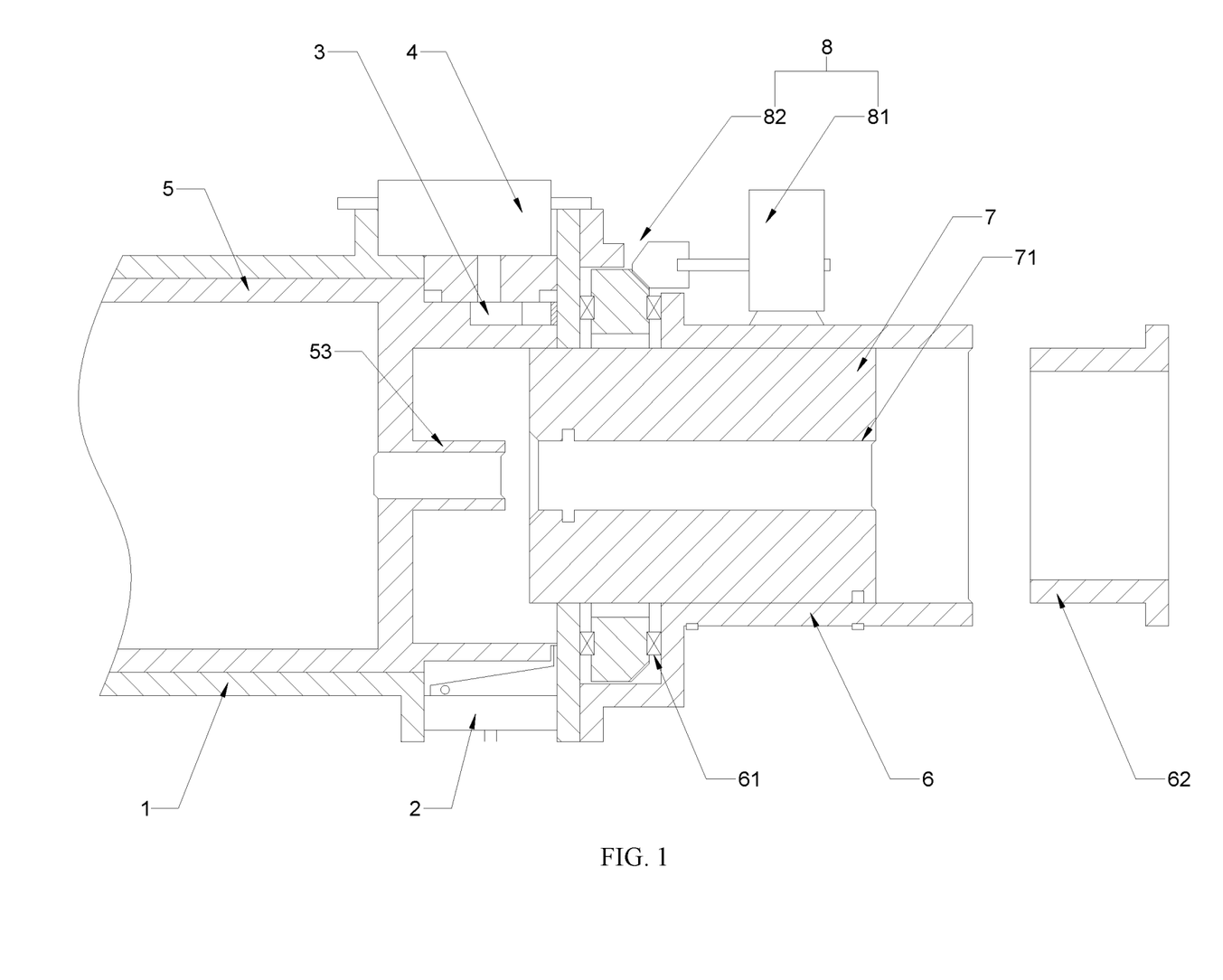
FIG. 1 is a sectional view of a stereoscopic structure of the present invention.
Figure 2:
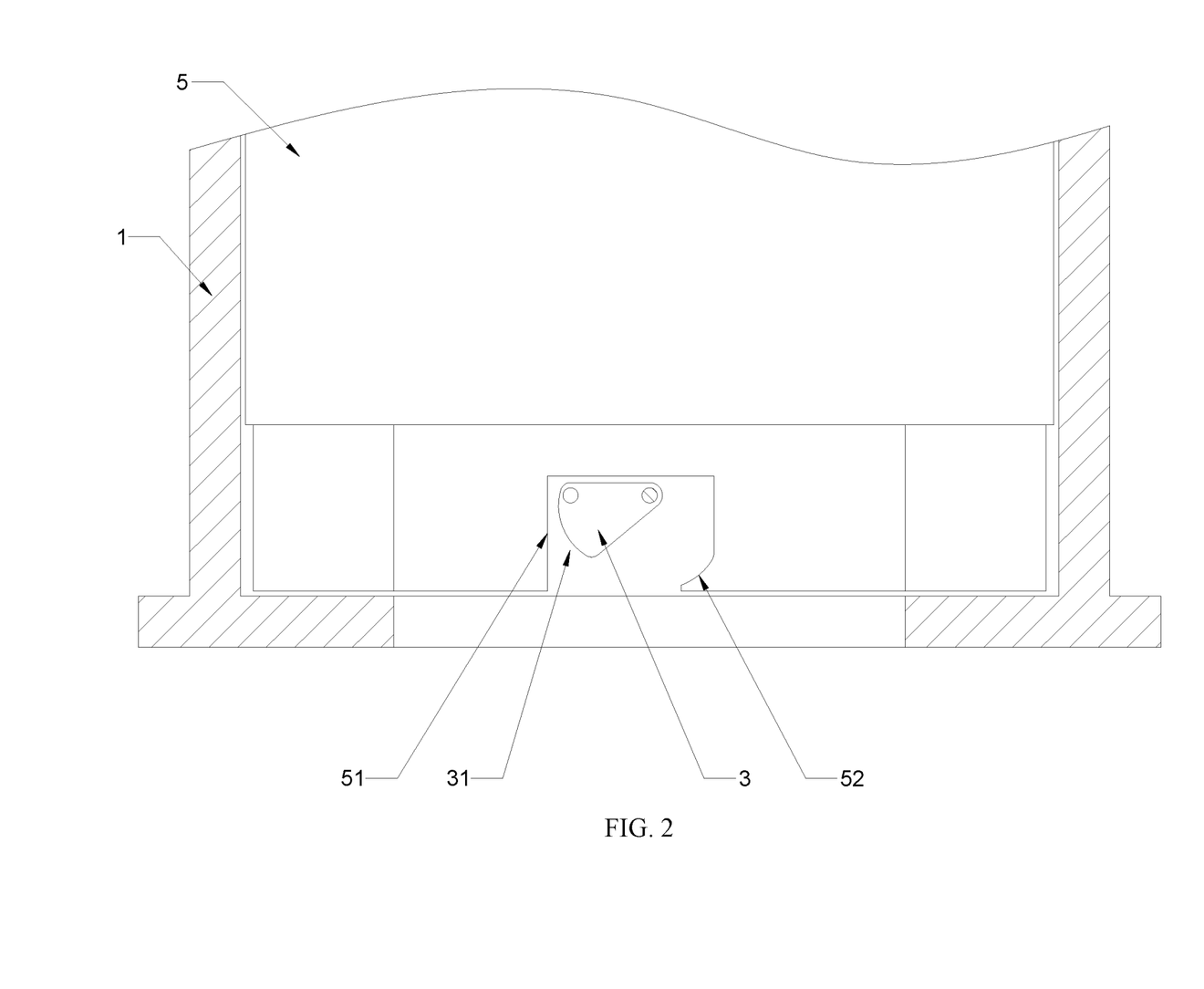
FIG. 2 is a schematic structural diagram when a limiting member is in a first locking position.
Figure 3:
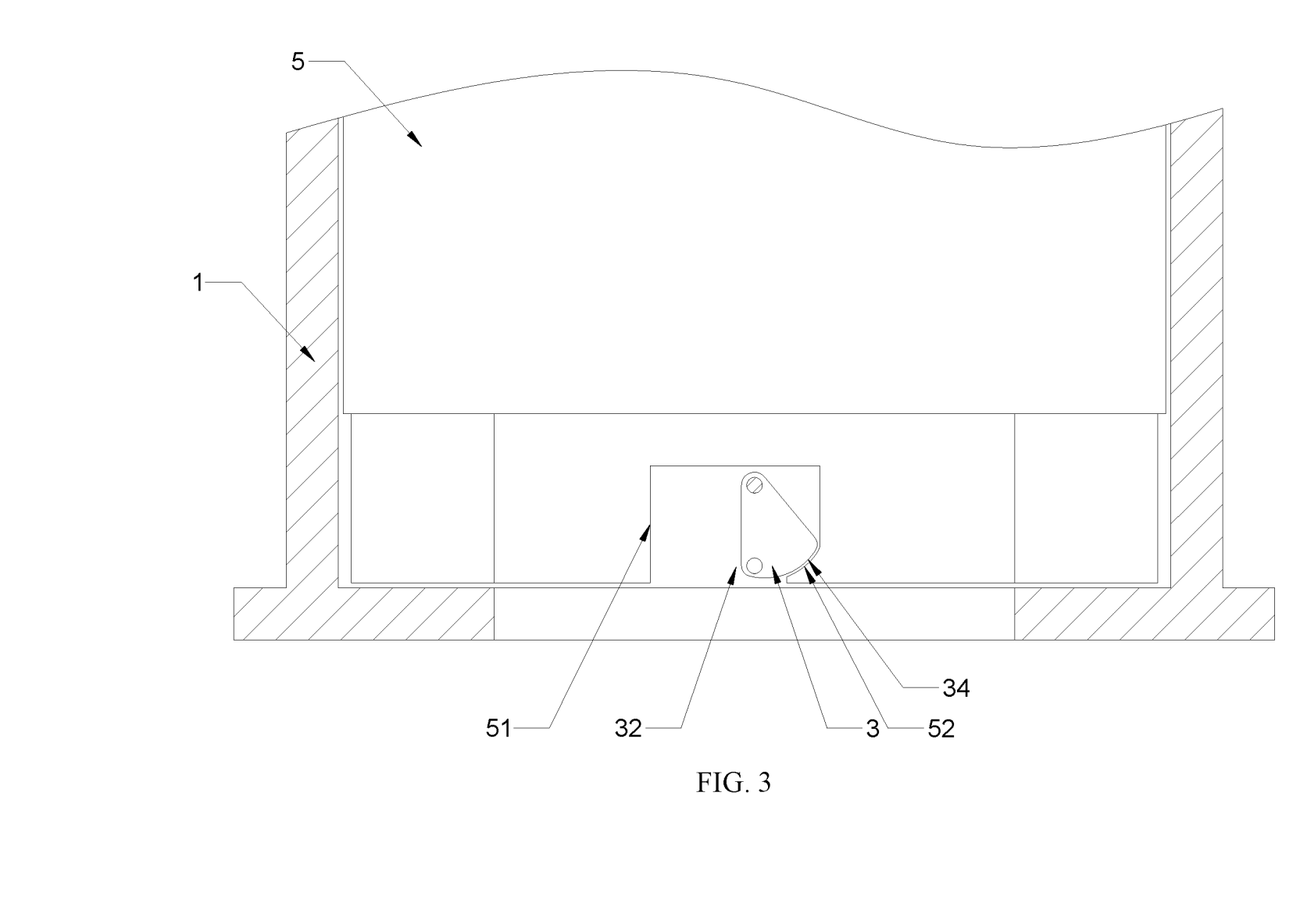
FIG. 3 is a schematic structural diagram when the limiting member is in a second locking position.

The shell 1 is further provided with a connecting seat 6, a connecting member 7 is arranged in the connecting seat 6, an end portion of the filter element 5 comprises a plurality of connector tubes 53, the connecting member 7 comprises a plurality of connecting holes 71 for inserting the connector tubes 53, and a connecting mechanism 8 for driving the connecting member 7 to be connected with the connector tubes 53 is also arranged on the connecting seat 6. When the filter element 5 is mounted, the filter element 5 is inserted into the cavity of the shell 1, and at this time, the limiting member 3 is in the first locking position 31, so that when the filter element 5 is inserted in a direction of the cavity, the limiting member 3 is inserted into the locking groove 51 through the opening. When the filter element 5 is completely mounted in the cavity, the end portion of the filter element 5 triggers the switch member 2, and at this time, the switch member 2 controls the driving mechanism 4 and the connecting mechanism 8 to start up, and the driving mechanism 4 drives the limiting member 3 to rotate. When the locking detection element detects that the limiting member 3 rotates to the second locking position 32, the driving mechanism 4 is controlled to stop rotating, so that the limiting mechanism 3 is in the second locking position 32 and the filter element 5 is locked, and the connecting mechanism 8 drives the connecting member 7 to move towards the filter element 5 and be connected with the connector tubes 53. Because the filter element 5 is locked when the limiting member 3 is in the second locking position 32, the connecting member 7 is connected with the connector tubes 53.

Figure 4:
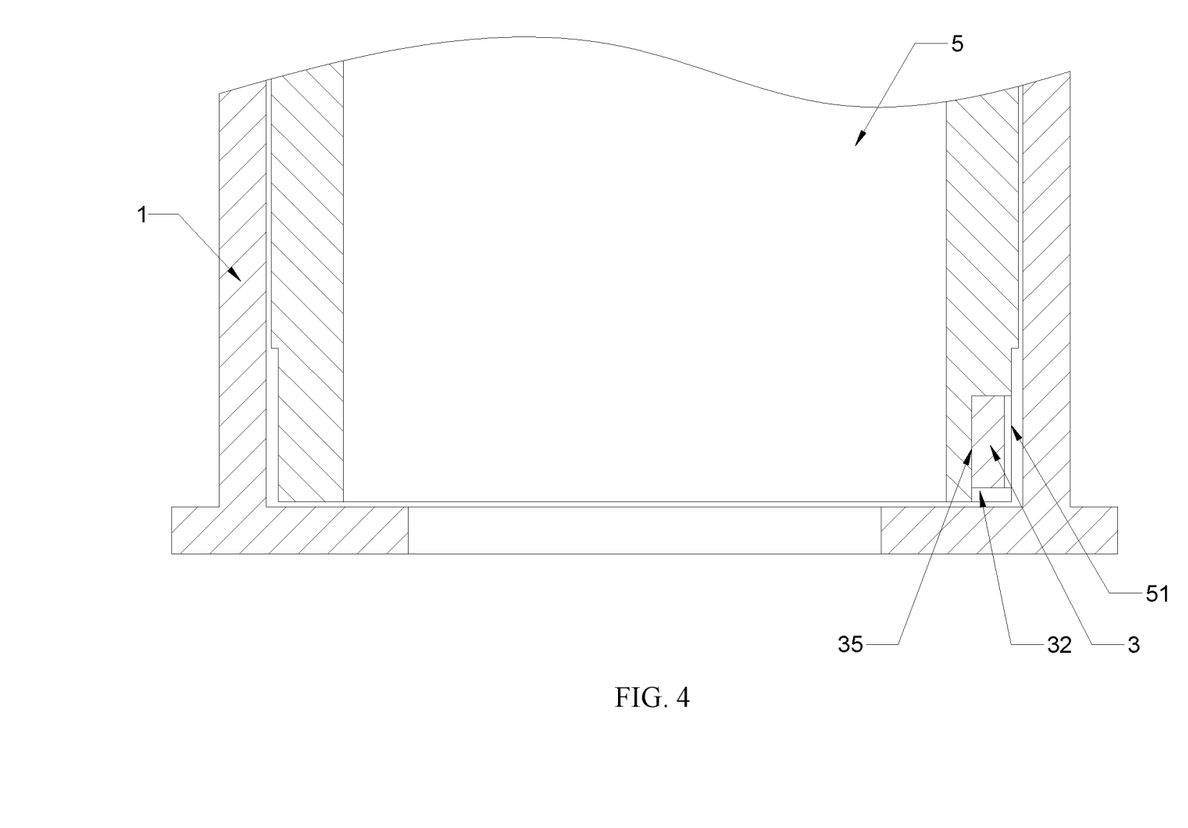
FIG. 4 is a schematic structural diagram that an abutting surface is provided when the limiting member is in the second locking position.

A fastening surface 52 is formed in the locking groove 51, and when the limiting member 3 is in the second locking position 32, the limiting member 3 provides a limiting surface 34 which abuts against and is locked with the fastening surface 52, and when the limiting surface 34 abuts against the fastening surface 52, the filter element 5 is locked in an axial direction, so as to limit the displacement of the filter element 5 in the axial direction, so that the filter element 5 is not easy to deviate in the axial direction under a hydraulic pressure fluctuation. A slidable cambered surface is comprised between the fastening surface 52 and the limiting surface 34, and a vertical distance between a side wall of the locking groove connected with the fastening surface 52 and a center of circle of the fastening surface 52 is set to be smaller than a radius of the fastening surface 52, so that when the limiting member 3 is in the second locking position 32, the limiting member 3 is firmly locked with the filter element 5, and the limiting member 3 is not easy to be released from the fastening surface 52. When the limiting member 3 is in the second locking position 32, the limiting member provides an abutting surface 35 which is attached to the side wall of the locking groove 51, and the contact between the abutting surface 35 and the locking groove 51 forms circumferential locking of the filter element 5, so that the filter element 5 is not easy to rotate in the circumferential direction when the filter element is cylindrical, thus realizing axial and circumferential limiting of the filter element 5 when the limiting member 3 is in the second locking position 32, and achieving the purpose of locking the filter element 5.

Figure 6:
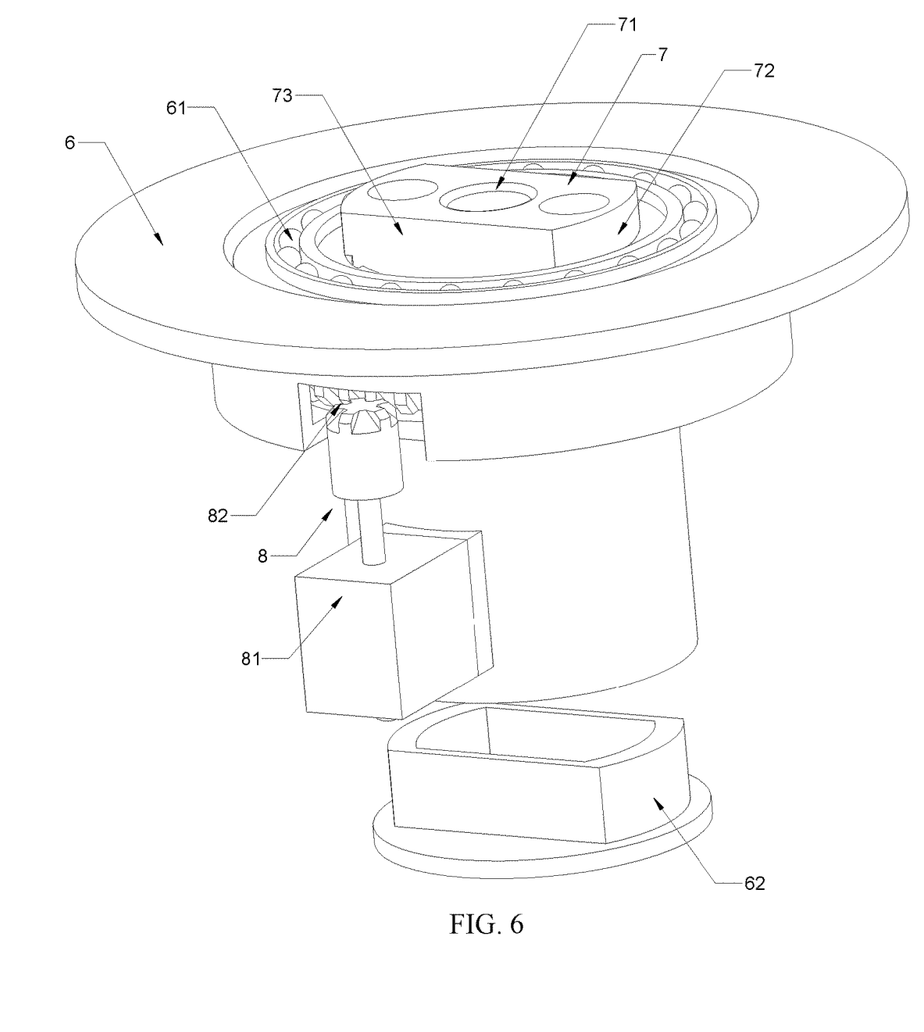
FIG. 6 is a schematic structural diagram of a connecting member driven by a connecting mechanism in Embodiment 2.

The connecting mechanism 8 comprises a control member 81 and a transmission member 82, the transmission member 82 is connected with the connecting member 7, and the control member 81 drives the connecting member 7 to move in an axial direction of the filter element 5 through the transmission member 82, so that the transmission member 82 provides a rotating force to drive the connecting member 7 to move to be connected with or separated from the filter element 5. The connecting member 7 provides a transmission surface 72 connected with the transmission member 82, so that the transmission member 82 converts the rotating force into a linear motion force through the transmission surface 72, and drives the connecting member 7 to move linearly in the axial direction of the filter element 5. The connecting member 7 is further provided with a guide surface 73 in contact with the connecting seat 6, and the guide surface 73 is used for guiding the connecting member 7 when the connecting member moves linearly, so that the connecting member 7 moves smoothly in the axial direction of the filter element 5 to be connected or separated. A resistance reduction member 61 is also arranged on the connecting seat 6, and the resistance reduction member 61 is connected with the transmission member 82, so that when the transmission member 82 rotates, the resistance reduction member 61 reduces rotating resistance of the transmission member 82. An end cover 62 is also arranged on one side of the connecting seat 6 far away from the shell 1, and the end cover 62 is used for limiting the connecting member 7, so that the connecting member 7 is not easy to be separated from the connecting seat 6 after being released from the connection with the filter element 5.

A plurality of position limit sensors for detecting a position of the connecting member 7 are arranged on the connecting seat 6, a position limit receiver for receiving a signal is arranged on the connecting member 7, and when the connecting member 7 is connected with the filter element 5, the position limit sensors send a signal of connection to the control member 81, and the control member 81 stops controlling the transmission member 82 to rotate, so as to stop driving the connecting member 7 to move, so that the connecting member 7 is firmly connected with the filter element 5, and after the connecting member 7 is released from the connection with the filter element 5, when the position limit sensors detect the connecting member 7, the control member 81 stops driving the connecting member 7 to rotate.

Figure 5:
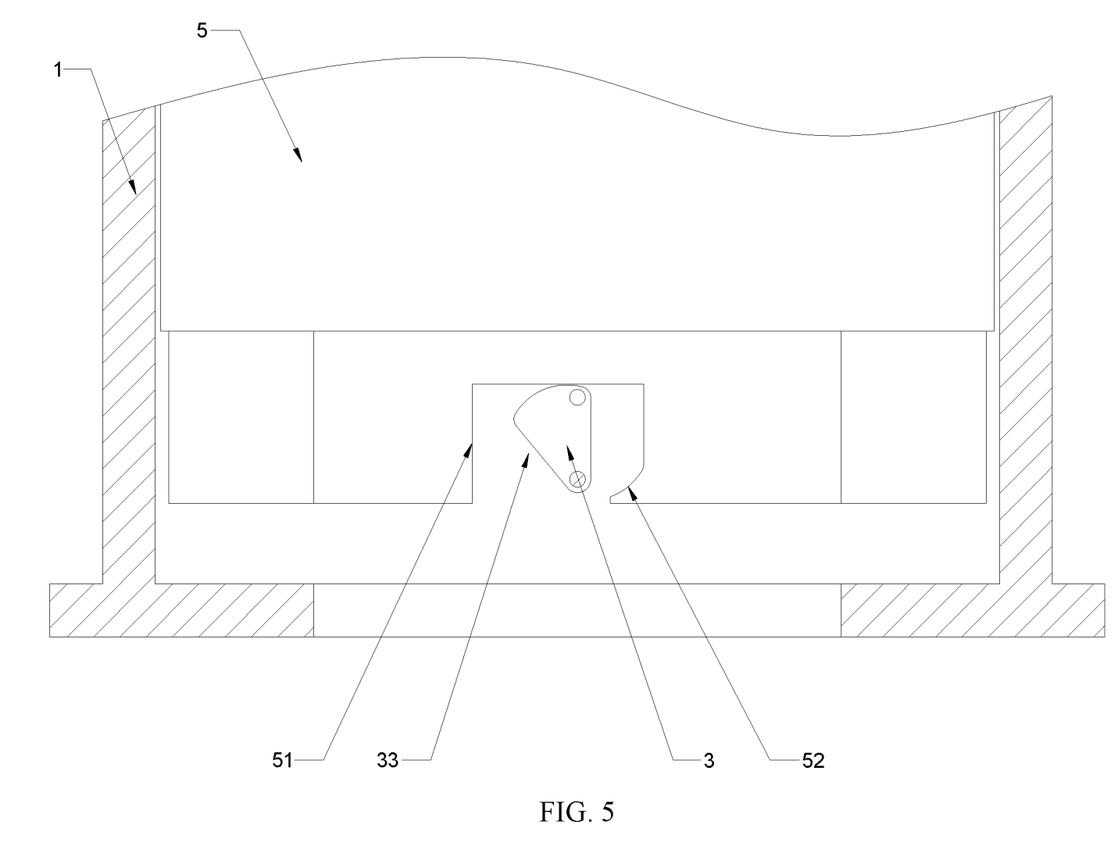
FIG. 5 is a schematic structural diagram when the limiting member is in a third locking position.

A controller for actively controlling the driving mechanism 4 and the connecting mechanism 8 is also arranged on the shell 1. The intelligent control detection unit further comprises a reset detection element, and the reset detection element is used for detecting whether the filter element is pulled out. When the controller is triggered, the control member 81 is controlled to drive the connecting member 7 to move away from the filter element 5 first, so that the filter element 5 is separated from the connecting member 7, and then the driving mechanism 4 is controlled to drive the limiting member 3 to move to the third locking position 33. When the locking detection element detects that the limiting member 3 moves to the third locking position 33, the driving mechanism 4 is controlled to stop rotating, and the limiting member 3 may be a cam or a rocker arm, so that a short axis and a long axis are formed after the limiting member 3 is connected with the driving mechanism 4. Therefore, when the driving mechanism 4 drives the limiting member 3 to rotate from the second locking position 32 to the third locking position 33, the limiting member 3 provides the ejecting force to eject the filter element 5, so that when the limiting member 3 rotates to the third locking position 33, the limiting member 3 provides the ejecting force to eject one end of the filter element 5 far away from the locking groove 51 from the shell 1, thus realizing the effect of intelligently and quickly controlling disassembly of the filter element 5, and facilitating an operator to take out the filter element 5. After the operator takes out the filter element 5, when the filter element is detected to be pulled out, the reset detection element sends a reset signal to the driving mechanism 4, and the driving mechanism 4 drives the limiting member 3 to reset and rotate from the third locking position 33 to the first locking position 31, so that when the filter element 5 is mounted again, it is convenient for the limiting member 3 to be inserted into the locking groove 51.

Working Principle and Effect:

When the filter element 5 is inserted into the shell 1, the filter element 5 is inserted along the cavity, and the limiting member 3 is inserted into the locking groove 51 through the opening. When the filter element 5 is completely inserted into the cavity, the filter element 5 touches the switch member 2 arranged on the shell 1, and when the switch member 2 is triggered, the driving mechanism 4 is controlled to drive the limiting member 3 to move to the second locking position 32. When the limiting member 3 is in the second locking position 32, the filter element 5 is locked, so that the filter element 5 will not move in the axial direction or rotate in the circumferential direction under the hydraulic pressure fluctuation, thus achieving the purpose of locking the filter element 5. After the limiting member 3 locks the filter element 5, the connecting member 7 is driven by the transmission member 82 to be connected with the connector tubes 53 on the filter element 5. During connecting, because the filter element 5 is locked, the connecting member 7 can be accurately connected with the filter element 5, thus facilitating the mounting of the filter element 5, making the filter element 5 not easy to displace in the axial direction and rotate in the circumferential direction, and achieving the effect of firm structure after mounting.

When the filter element 5 needs to be disassembled, the controller actively controls the driving mechanism 4 and the connecting mechanism 8, and the connecting mechanism 8 drives the connecting member 7 to be separated from the filter element 5. After the connecting member 7 is separated from the filter element 5, the driving mechanism 4 drives the limiting member 3 to rotate to the third locking position 33, and when the limiting member 3 is in the third locking position 33, the limiting member provides the ejecting force to eject the filter element 5, so that the filter element 5 can be quickly disassembled from the shell 1. When the filter element 5 is pulled out, the reset detection element sends the reset signal to the driving mechanism 4 when detecting that the filter element 5 is pulled out, and the driving mechanism 4 drives the limiting member 3 to rotate from the third locking position 33 to the first locking position 31 to make the limiting member 3 reset, so that when the filter element 5 is inserted again, the limiting member 3 can be inserted into the locking groove 51.

Embodiment 2

A specific implementation of a filter element mounting structure according to the present invention is different from Embodiment 1 in that: with reference to FIG. 1 and FIG. 6, the side wall of the shell 1 is provided with a clamping groove, the switch member 2 is arranged in the clamping groove, and a contact piece of the switch member 2 extends into the cavity, so that when the filter element 5 is completely mounted in the cavity, the end portion of the filter element 5 abuts against the contact piece of the switch member 2, thus triggering the switch member 2. The driving mechanism 4 is a motor, and the driving mechanism 4 drives the limiting member 3 to rotate to the first locking position 31 or the third locking position 33 through an exciting mode.

The control member 81 is a servo motor, the transmission member 82 is a gear set, the gear set comprises a driving gear and a transmission gear meshed with the driving gear, a tooth slot is formed on the connecting seat 6, the transmission gear is arranged in the tooth slot, the connecting member 7 is inserted into the transmission gear, the transmission surface 72 of the connecting member 7 is threaded, the transmission gear is threadedly connected with the connecting member 7, the driving gear is coaxially and fixedly connected with the control member 81, and the driving gear is driven to rotate through the control member 81, so as to drive the transmission gear to rotate, thus driving the connecting member 7 to move linearly in the axial direction of the filter element 5. The guide surface 73 provided by the connecting member 7 is symmetrically arranged along an axis of the connecting member 7, the resistance reduction member 61 is a tapered roller bearing, and two sides of the transmission gear are both provided with the resistance reduction member 61, so that when the transmission gear rotates, the resistance reduction member 61 is used for reducing friction resistance of rotation.

Embodiment 3

Figure 7:
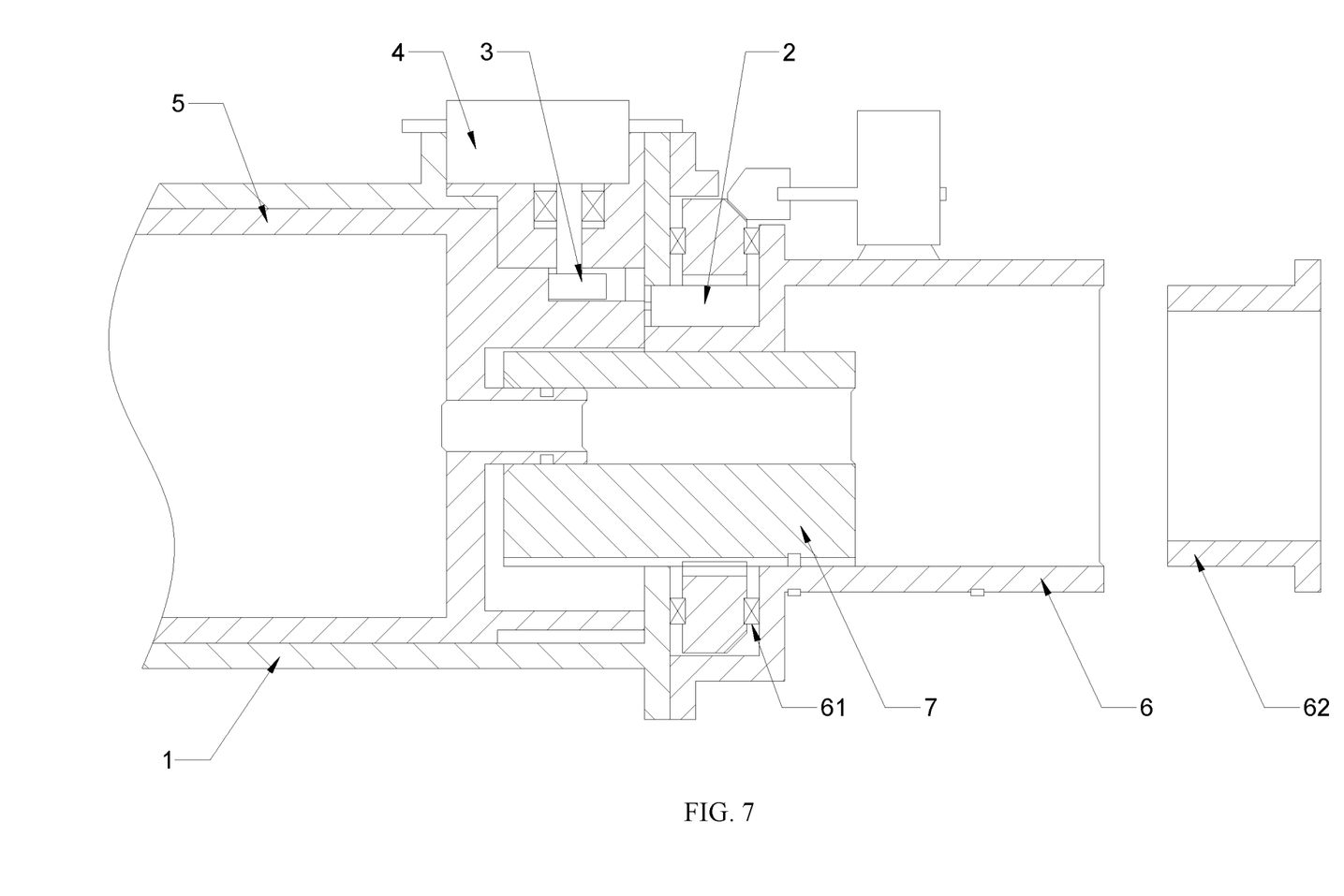
FIG. 7 is a sectional view of a stereoscopic structure of the present invention in Embodiment 3.
Figure 8:
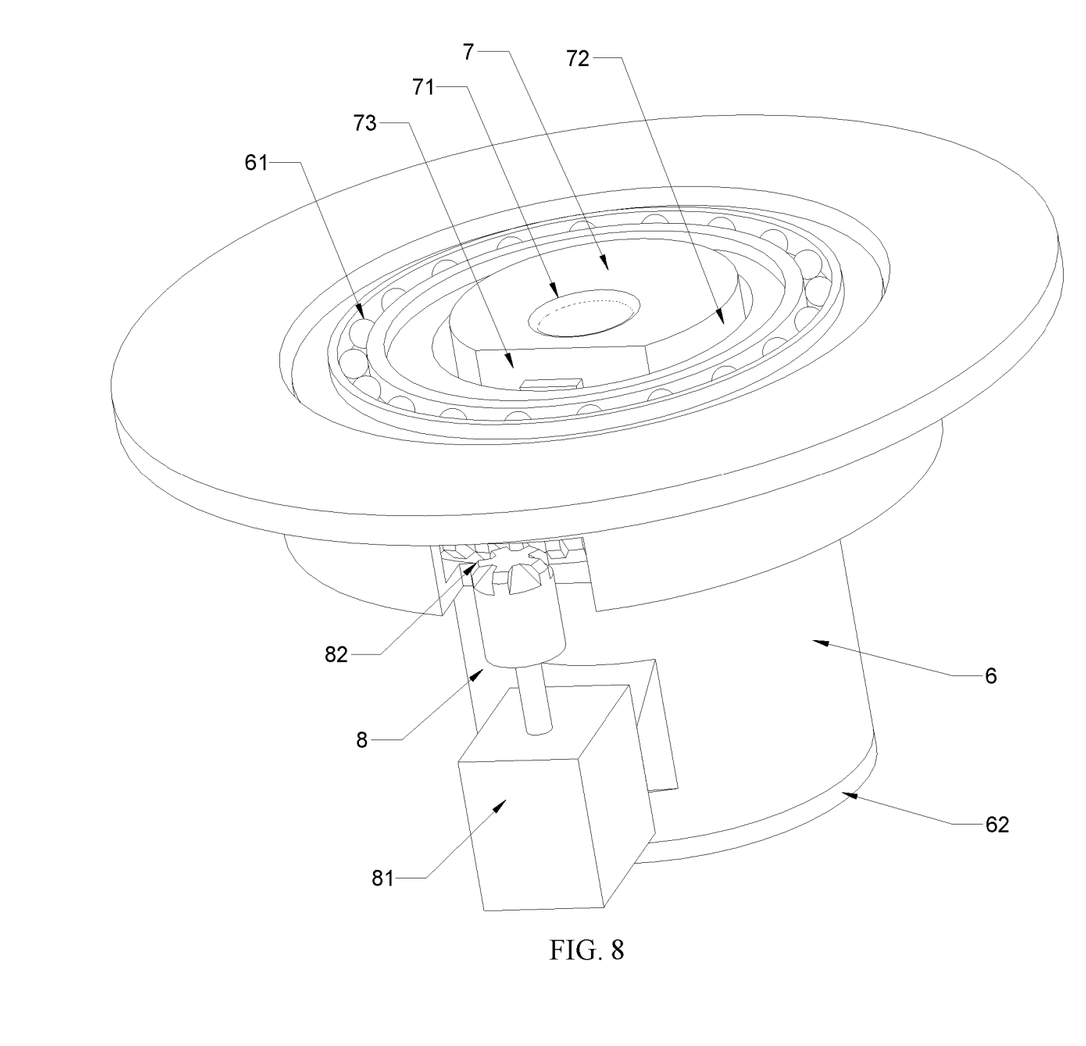
FIG. 8 is a schematic structural diagram of a connecting member driven by a connecting mechanism in Embodiment 3.

A specific implementation of a filter element mounting structure according to the present invention is different from Embodiment 2 in that: with reference to FIG. 7 and FIG. 8, the switch member 2 is arranged on one side of the shell 1 oriented to the connecting seat 6, and when the filter element 5 is completely mounted in the cavity, the end portion of the filter element 5 triggers the switch member 2. The guide surface 73 on the connecting member 7 is formed on one side of the connecting member 7, an avoidance gap is formed between the guide surface 73 of the connecting member 7 and the transmission member 82, and the switch member 2 is arranged in the avoidance gap, so that when the connecting seat 6 is mounted with the shell 1, the connecting seat is not easy to interfere with the switch member 2.

In addition, although the exemplary embodiments have been described in the present invention, the scope comprises any and all embodiments with equivalent elements, modifications, omissions, combinations (such as solutions in which various embodiments are intersected), adaptations or changes based on the present invention. The elements in the claims will be broadly explained based on the language adopted in the claims, and are not limited to the examples described in the specification or during the implementation of the present application, and the examples will be explained as being non-exclusive. Therefore, the specification and the examples are intended to be considered as examples only, with a true scope and spirit indicated by the following claims along with the full scope of their equivalents.

The above description is intended to be illustrative rather than limiting. For example, the above examples (or one or more solutions thereof) can be used in mutual combination. For example, those of ordinary skills in the art may use other embodiments when reading the above description. In addition, in the above specific implementations, various features may be grouped together to simplify the present invention, which should not be explained as an intention that an unclaimed disclosed feature is essential to any claim. On the contrary, the subjects of the present invention may be less than all features of particular disclosed embodiments. Therefore, the following claims are incorporated into the specific implementations herein as examples or embodiments, wherein each claim independently serves as a separate embodiment, and it is considered that these embodiments may be combined with each other in various combinations or arrangements. The scope of the present invention should be determined with reference to the appended claims along with the full range of their equivalents to which these claims are entitled.

The above embodiments are only exemplary embodiments of the present application, and are not used to limit the present invention, and the scope of protection of the present invention is defined by the claims. Those skilled in the art may make various modifications or equivalent substitutions on the present invention within the essence and the scope of protection of the present invention, and such modifications or equivalent substitutions should also be regarded as falling within the scope of protection of the present invention.

We claim:

1. A filter element mounting structure,
   comprising a driving mechanism (4) arranged on a shell (1), wherein the driving mechanism (4) is connected with a limiting member (3);
   a switch member (2), wherein the switch member (2) is arranged on the shell (1); and
   a filter element (5), wherein a cavity for mounting the filter element (5) is also formed in the shell (1), and a locking groove (51) is formed on the filter element (5);
   wherein, when the driving mechanism (4) drives the limiting member (3) to move, a movement position of the limiting member (3) is divided into a plurality of locking positions, and the plurality of locking positions comprise a first locking position (31), a second locking position (32) and a third locking position (33);
   the driving mechanism (4) drives the limiting member (3) to be in the first locking position (31), when the filter element (5) is mounted in the shell (1), the limiting member (3) is inserted into the locking groove (51), and the filter element (5) touches the switch member (2), when the switch member (2) is touched, the driving mechanism (4) drives the limiting member (3) to move to stop in the second locking position (32), and when the limiting member (3) is in the second locking position (32), the filter element (5) is locked; and
   when the driving mechanism (4) drives the limiting member (3) to move to the third locking position (33), the limiting member (3) provides an ejecting force to eject the filter element (5), and the filter element (5) is ejected from the shell (1) under an action of the ejecting force.

2. The filter element mounting structure according to claim 1, wherein a width of an opening of the locking groove (51) is larger than a width of the limiting member (3), so that when the limiting member (3) is in the first locking position (31), the limiting member (3) is inserted into the locking groove (51) through the opening of the locking groove (51).

3. The filter element mounting structure according to claim 1, wherein a fastening surface (52) is formed in the locking groove (51), and when the limiting member (3) is in the second locking position (32), the limiting member (3) provides a limiting surface (34) which abuts against and is locked with the fastening surface (52), and when the limiting surface (34) abuts against the fastening surface (52), the filter element (5) is locked in an axial direction.

4. The filter element mounting structure according to claim 1, wherein when the limiting member (3) is in the second locking position (32), the limiting member (3) provides an abutting surface (35) which is attached to a side wall of the locking groove (51), and when the abutting surface (35) abuts against the filter element (5), the filter element (5) is locked in a circumferential direction.

5. The filter element mounting structure according to claim 1, wherein the driving mechanism (4) provides a rotating force to drive the limiting member (3) to rotate.

6. The filter element mounting structure according to claim 1, further comprising an intelligent control detection unit, wherein the intelligent control detection unit comprises a reset detection element and a locking detection element, a locking detection position is arranged in the cavity, the locking detection element is arranged in the locking detection position, the locking detection element is used for detecting whether the limiting member (3) is in the locking position, and the reset detection element is used for detecting whether the filter element (5) is pulled out.

7. The filter element mounting structure according to claim 6, wherein when the filter element (5) touches the switch member (2), the switch member (2) forms an electrical signal, the driving mechanism (4) drives the limiting member (3) to move when receiving the electrical signal, and when the locking detection element detects that the limiting member (3) is in the locking position, the driving mechanism (4) is controlled to stop driving the limiting member (3) to move.

8. The filter element mounting structure according to claim 6, wherein the reset detection element sends a reset signal to the driving mechanism (4) when detecting that the filter element (5) is pulled out, and the driving mechanism (4) drives the limiting member (3) to move to the first locking position (31).

9. The filter element mounting structure according to claim 1, wherein the shell (1) is further provided with a connecting seat (6) in an inner side direction of the cavity, a connecting member (7) is arranged in the connecting seat (6), an end portion of the filter element (5) comprises a connector tube (53), the connecting member (7) comprises a connecting hole (71) for inserting the connector tube (53), a connecting mechanism (8) for driving the connecting member (7) to be connected with the connector tube (53) is also arranged on the connecting seat (6), and the switch member (2) also controls the connecting mechanism (8) to start up, so as to drive the connecting member (7) to move towards the filter element (5) and be connected with the connector tube (53).

10. The filter element mounting structure according to claim 9, wherein the connecting mechanism (8) comprises a control member (81) and a transmission member (82), the transmission member (82) is connected with the connecting member (7), the control member (81) drives the connecting member (7) to move in an axial direction of the filter element (5) through the transmission member (82), and the transmission member (82) provides a rotating force to drive the connecting member (7) to move.

11. The filter element mounting structure according to claim 10, wherein the connecting member (7) provides a transmission surface (72) connected with the transmission member (82), and the transmission member (82) drives the connecting member (7) to move in the axial direction of the filter element (5) through the transmission surface (72).

12. The filter element mounting structure according to claim 10, wherein the connecting member (7) is further provided with a guide surface (73) in contact with the connecting seat (6), and the guide surface (73) is used for moving the connecting member (7) in the axial direction of the filter element (5).

13. The filter element mounting structure according to claim 10, wherein a plurality of position limit sensors for detecting a position of the connecting member (7) are arranged on the connecting seat (6), a position limit receiver is arranged on the connecting member (7), and when the connecting member (7) is connected with the filter element (5), the position limit sensors send an electrical signal of connection to the control member (81), and the control member (81) stops controlling the transmission member (82) to drive the connecting member (7) to move.

14. The filter element mounting structure according to claim 10, wherein a resistance reduction member (61) is also arranged on the connecting seat (6), the resistance reduction member (61) is connected with the transmission member (82), and the resistance reduction member (61) is used for reducing resistance of the transmission member (82) during rotating.

15. The filter element mounting structure according to claim 9, wherein a controller for actively controlling the driving mechanism (4) and the connecting mechanism (8) is also arranged on the shell (1), when the controller is triggered, the control member (81) is controlled to drive the connecting member (7) to move away from the filter element (5), and when the controller is triggered, the driving mechanism (4) is also controlled to start up, and the driving mechanism (4) drives the limiting member (3) to move to the third locking position (33).

* * * * *